United States Patent [19]
Naruse et al.

[11] Patent Number: 6,075,811
[45] Date of Patent: Jun. 13, 2000

[54] RECEIVING APPARATUS, RECEIVING METHOD, AND TERMINAL UNIT FOR USE WITH RADIO SYSTEM

[75] Inventors: Tetsuya Naruse, Chiba; Nobuhiko Watanabe, Kanagawa, both of Japan

[73] Assignee: Sony Corporation, Tokyo, Japan

[21] Appl. No.: 09/003,442

[22] Filed: Jan. 6, 1998

[30] Foreign Application Priority Data

Jan. 14, 1997 [JP] Japan ................................. 9-004989

[51] Int. Cl.⁷ .................................................. H04B 15/00
[52] U.S. Cl. ........................... 375/206; 375/200; 375/347
[58] Field of Search ................................. 375/206, 200, 375/347, 349; 370/342; 455/65

[56] References Cited

U.S. PATENT DOCUMENTS

| | | | |
|---|---|---|---|
| 5,754,583 | 5/1998 | Eberhardt et al. | 375/200 |
| 5,764,687 | 6/1998 | Easton | 375/206 |
| 5,799,004 | 8/1998 | Keskitlo et al. | 370/335 |
| 5,910,950 | 6/1999 | Brink | 370/342 |

*Primary Examiner*—Stephen Chin
*Assistant Examiner*—Mohammad Ghayour
*Attorney, Agent, or Firm*—Jay H. Maioli

[57] ABSTRACT

A receiving apparatus for receiving a signal that has been spectrum-spread with a spread code, comprising a searcher for searching paths of signals received from multi-paths, a plurality of fingers for de-spreading the received signals for the searched paths and demodulating data, a combiner for combining output data of the fingers, and a controller for controlling the receiving operation, wherein in a reception state the controller designates control information of the searcher for the next reception state and then keeps a stopped state until the searcher completes an operation corresponding to the control information so as to intermittently receive the signal. Thus, the power consumption of the controller can be decreased.

5 Claims, 13 Drawing Sheets

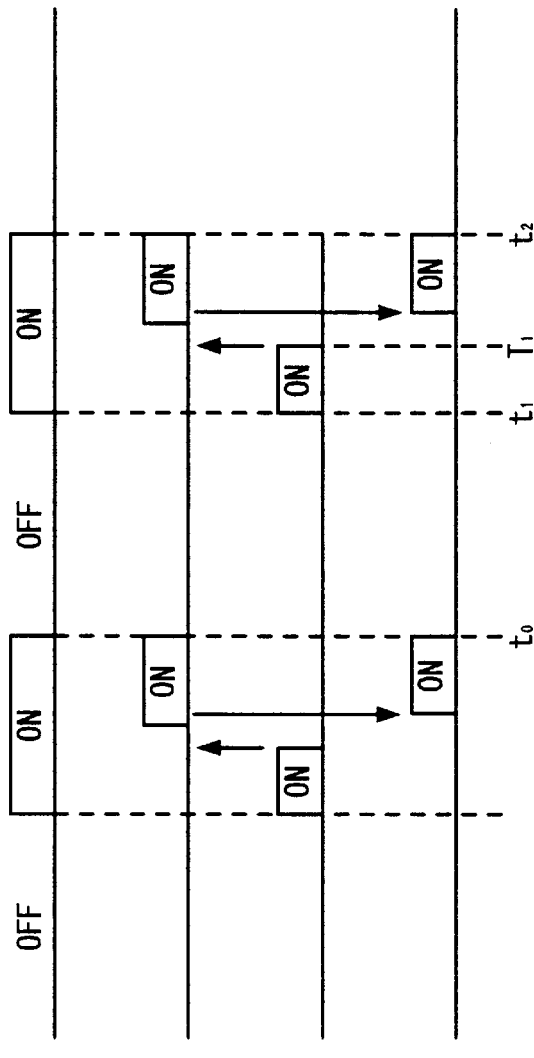

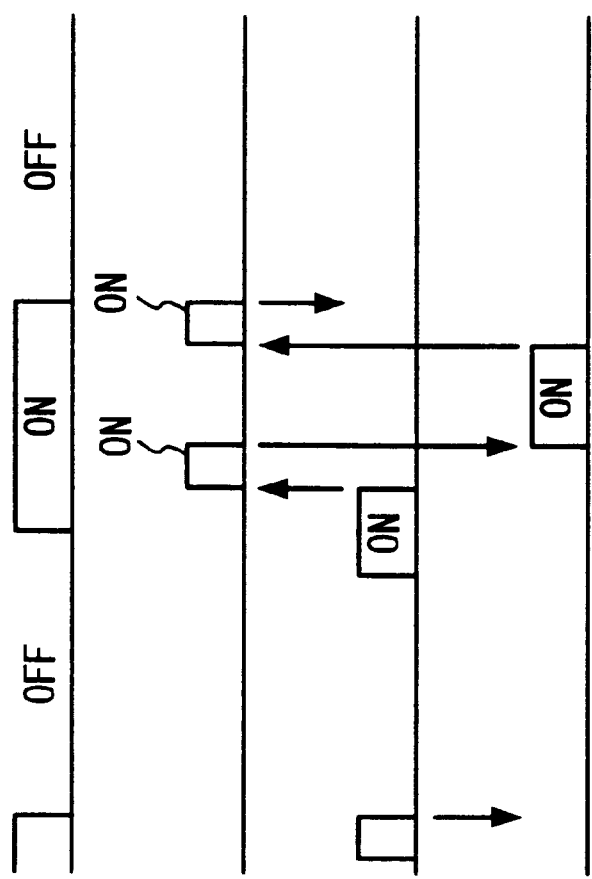

RECEIVING APPARATUS, RECEIVING METHOD, AND TERMINAL UNIT FOR USE WITH RADIO SYSTEM

BACKGROUND OF THE INVENTION

1. Field of the Invention

The present invention relates to a receiving apparatus suitable for a CDMA (Code Division Multiple Access) type cellular telephone system, a receiving method thereof, and a terminal unit for use with a radio system thereof.

2. Description of the Related Art

In recent years, CDMA type cellular telephone systems have become popular. In the CDMA type cellular telephone system, a pseudo-random code is used as a spread code. A carrier of a transmission signal is spectrum-spread. The pattern and phase of each spread code in the code sequence are varied so as to perform a multiple access.

In the CDMA system, the spread spectrum method is used. In the spectrum spread system, when data is transmitted, the carrier is primarily modulated with the transmission data. In addition, the carrier that has been primarily modulated is multiplied by a PN (Pseudorandom Noise) code. Thus, the carrier is modulated with the PN code. As an example of the primarily modulating method, balanced QPSK modulating method is used. Since the PN code is a random code, when the carrier is modulated by the PN code, the frequency spectrum is widened.

When data is received, the received data is multiplied by the same PN code that has been modulated on the transmission side. When the same PN code is multiplied and the phase is matched, the received data is de-spread and thereby primarily modulated data is obtained. When the primarily modulated data is demodulated, the original data is obtained.

In the spectrum spread method, to de-spread the received signal, the same PN code that has been used on the transmission side is required for both the pattern and the phase. Thus, when the pattern and the phase of the PN code are varied, the multiple access can be performed. The method for varying the pattern and the phase of each spread code in the code sequence, thereby performing the multiple access is referred to as CDMA method. In cellular telephone systems, an FDMA (Frequency Division Multiple Access) system and a TDMA (Time Division Multiple Access) system have been used. However, the FDMA system and the TDMA system cannot deal with a drastic increase of the number of users. In other words, in the FDMA system, the multiple access is performed on different frequency channels. In an analog cellular telephone system, the FDMA system is usually used.

However, in the FDMA system, since the frequency use efficiency is bad, a drastic increase of the number of users tends to cause channels to run short. When the intervals of channels are narrowed for the increase of the number of channels, the adjacent channels adversely interfere with each other and thereby the sound quality deteriorates.

In the TDMA system, the transmission data is compressed on the time base. Thus, the use time is divided and thereby the same frequency is shared. The TDMA system has been widely used as a digital cellular telephone system. In the TDMA system, the frequency use efficiency is improved in comparison with the simple FDMA system. However, in the TDMA system, the number of channels is restricted. Thus, it seems that as the number of users drastically increases, the number of channels runs short. On the other hand, the CDMA system has excellent interference resistance. Thus, in the CDMA system, adjacent channels do not interfere with each other. Consequently, the frequency use efficiency improves and more channels can be obtained. In the FDMA system and the TDMA system, signals tend to be affected by fading due to multi-paths. In other words, as shown in FIG. 1, a signal is sent from a base station 201 to a portable terminal unit 202 through a plurality of paths. In addition to a path P1 in which a radio wave of the base station 201 is directly sent to the portable terminal unit 202, there is a path P2, a path P3, and so forth. In the path P2, the radio wave of the base station 201 is reflected by a building 203A and sent to the portable terminal unit 202. In the path P3, the radio wave of the base station 201 is reflected by a building 203B and sent to the portable terminal unit 202.

The radio waves that are reflected by the buildings 202A and 203B and sent to the portable terminal unit 202 through the paths P2 and P3 are delayed from the radio wave that is directly sent from the base station 201 to the portable terminal unit 202 through the path P1. Thus, as shown in FIG. 2, signals S1, S2, and S3 reach the portable terminal unit 202 through the paths P1, P2, and P3 at different timings, respectively. When the signals S1, S2, and S3 through the paths P1, P2, and P3 interfere with each other, a fading takes place. In the FDMA system and the TDMA system, the multi-paths cause the signal to be affected by the fading.

On the other hand, in the CDMA system, with diversity RAKE method, the fading due to the multi-paths can be alleviated and the S/N ratio can be improved.

In the diversity RAKE system, as shown in FIG. 3, receivers 221A, 221B, and 221C that receive signals S1, S2, and S3 through the paths P1, P2, and P3 are disposed, respectively. A timing detector 222 detects codes received through the individual paths. The codes are set to the receivers 221A, 221B, 221C corresponding to the paths P1, P2, and P3, respectively. The receivers 221A, 221B, and 221C demodulate the signals received through the paths P1, P2, and P3. The received output signals of the receivers 221A, 221B, and 221C are combined by a combining circuit 223.

In the spectrum spread system, signals received through different paths are prevented from interfering with each other. The signals received through the paths P1, P2, and P3 are separately demodulated. When the demodulated output signals received through the respective paths are combined, the signal intensity becomes large and the S/N ratio improves. In addition, the influence of the fading due to the multi-paths can be alleviated.

In the above-described example, for simplicity, with the three receivers 221A, 221B, and 221C and the timing detector 222, the structure of the diversity RAKE system was shown. However, in reality, in a cellular telephone terminal unit of diversity RAKE type, as shown in FIG. 4, fingers 251A, 251B, and 251C, a searcher 252, and a data combiner 253 are disposed. The fingers 251A, 251B, and 251C obtain demodulated output signals for the respective paths. The searcher 252 detects signals through multi-paths. The combiner 253 combines the demodulated data for the respective paths.

In FIG. 4, a received signal as a spectrum spread signal that has been converted into an intermediate frequency is supplied to an input terminal 250. This signal is supplied to a sub-synchronous detecting circuit 255. The sub-synchronous detecting circuit 255 is composed of a multiplying circuit. The sub-synchronous detecting circuit 255 multiplies a signal received from the input terminal 250 by an output signal of a PLL synthesizer 256. An output signal of the PLL synthesizer 256 is controlled with an output signal of a frequency combiner 257. The sun-sinchronous detecting circuit 255 performs a quadrature detection for the received signal.

An output signal of the sub-synchronous detecting circuit 255 is supplied to an A/D converter 258. The A/D converter 258 converts the input signal into a digital signal. At this point, the sampling frequency of a controller 258 is much higher than the frequency of the PN code that is spectrum-spread. In other words, the input signal of the A/D converter 258 is over-sampled.

An output signal of the controller 258 is supplied to the fingers 251A, 251B, and 251C. In addition, the output signal of the controller 254 is supplied to the searcher 252. The fingers 251A, 251B, and 251C de-spread the signals received through the respective paths, synchronize the signals, acquire the synchronization of the received signals, demodulate the data of these signals, and detect frequency errors of the signals.

The searcher 252 acquires the PN codes of the received signals and designates the phase of the PN codes of the paths to the fingers 251A, 251B, and 251C. In other words, the searcher 252 has a de-spreading circuit that multiplies a received signal by a PN code and de-spreads the signal. In addition, the searcher 252 shifts the phase of the PN code and obtains the correlation with the received PN code under the control of the controller 258. With the correlation between a designated code and a received code, phase of PN code for each path is determined.

An output signal of the searcher 252 is supplied to the controller 258. The controller 258 designates the phases of the PN codes for the fingers 251A, 251B, and 251C corresponding to the output signal of the searcher 252. The fingers 251A, 251B, and 251C de-spread the received signals and demodulate the received signals received through the respective phases corresponding to the designated phases of the PN codes.

The demodulated data is supplied from the fingers 251A, 251B, and 251C to the data combiner 253. The data combiner 253 combines the received signals received through the respective paths. The combined signal is obtained from an output terminal 259.

The fingers 251A, 251B, and 251C detect frequency errors. The frequency errors are supplied to the frequency combiner 257. With an output signal of the frequency combiner 257, the oscillation frequency of the PLL synthesizer 256 is controlled.

In the portable telephone terminal unit of RAKE type, the searcher 252 has the structure as shown in FIG. 5.

In FIG. 5, a digital signal is supplied from the A/D converter 258 (see FIG. 4) to an input terminal 301. As described above, the sampling frequency of the A/D converter 258 is higher than the frequency of a PN code. In other words, the digital signal is over-sampled. The digital signal is supplied from the input terminal 301 to a decimating circuit 302. The decimating circuit 302 decimates the signal received from the input terminal 301. An output signal of the decimating circuit 302 is supplied to a multiplying circuit 303.

A PN code generating circuit 304 generates a PN code that has spread on the transmission side. The phase of the PN code received from the PN code generating circuit 304 can be designated by a controller 258. The PN code received from the PN code generating circuit 304 is supplied to the multiplying circuit 303.

The multiplying circuit 303 multiplies the output signal of the decimating circuit 302 by the PN code received from the PN code generating circuit 304. Thus, the received signal from the input terminal 301 de-spreads. When the pattern and the phase of the received code match the pattern and the phase of the code received from the PN code generating circuit 304, the received signal de-spreads. Thus, the level of an output signal of the multiplying circuit 303 becomes large. The output signal of the multiplying circuit 303 is supplied to a level detecting circuit 307 through a band pass filter 306. The level detecting circuit 307 detects the level of the output signal of the multiplying circuit 303.

An output signal of the level detecting circuit 307 is supplied to an adding circuit 308. The adding circuit 308 cumulates output data a predetermined number of times (for example, 64 times). With the cumulated value of the output data of the level detecting circuit 307, correlation values of the code designated to the PN code generating circuit 304 and the received code are obtained. An output signal of the adding circuit 308 is supplied to a memory 309.

The phase of the PN code received from the PN code generating circuit 304 is shifted every predetermined number of chips. The correlation value is obtained from the output signal of the adding circuit 308 for each phase. The correlation value is stored in the memory 309. After the PN code has been designated for one period, the correlation values stored in the memory 309 are sorted in the order of larger correlation values by the controller 258. For example, three phases with the largest correlation values are selected. The selected phases are designated to the fingers 251A, 251B, and 251C (see FIG. 6).

FIG. 6 is a flow chart showing a process of the searcher. In FIG. 6, the phase of the PN code generating circuit 304 is designated to the initial value (at step ST101). The number of additions is cleared (at step ST102). The cumulated value of the adding circuit 308 is cleared (at step ST103).

When the initial phase is designated to the PN code generating circuit 304, the multiplying circuit 303 de-spreads the received signal with the designated PN code. The adding circuit 308 cumulates the de-spread signal level (at step ST104). Whenever the signal level is cumulated, the number of additions is incremented (at step ST105). Next, it is determined whether or not the number of additions exceeds a predetermined value (for example, 64) (at step ST106). The signal level is cumulated until the number of additions becomes 64. Thus, the correlation value is obtained. When the number of additions becomes 64, the correlation value at the time is stored in the memory 309 (at step ST107).

It is determined whether or not the last phase of the PN code generating circuit 304 has been designated (at step ST108). When the last phase has not been designated, the phase of the PN code is advanced or delayed by a predetermined value (at step ST109). Thereafter, the flow returns to step ST102. With the phase of the PN code that has been shifted for the predetermined value, the above-described process is repeated.

When the phase of the PN code is shifted for one period, at step ST10, the last phase of the PN code has been designated. Thus, the determined result at step ST108 becomes Yes. At this point, the correlation values stored in the memory 309 are sorted and the largest three correlation values are obtained (at step ST110). The three phases corresponding to the three largest correlation values are designated to the fingers 251A, 251B, and 251C (at step ST111).

In the standby state, such a portable terminal unit intermittently receives termination call information and so forth from a base station. As described above, conventionally, the searcher 252 performs a searching process under the control of the controller 258. Thus, conventionally, to intermittently receive information, the controller 258 starts operating and then the searcher performs the searching process under the control of the controller 258.

In other words, as shown in FIG. 7, when the portable terminal unit intermittently receives information, the controller 258 starts operating (at step ST101). Next, the searcher 252 starts operating. Under the control of the controller 258, the searcher 252 performs the searching process (at step ST102). After the searcher 252 has completed the searching process, the phases of the PN codes of the individual paths are designated to the fingers 251A, 251B, and 251C. Thus, the fingers 251A, 251B, and 251C start operating (at step ST103).

Thus, as shown in FIG. 8A, it is assumed that the portable terminal unit enters the reception mode from time $t_{11}$ to time $t_{12}$. As shown in FIG. 8B, the controller 258 starts operating. Next, as shown in FIG. 8C, the searcher 252 starts operating under the control of the controller 258. After the searcher 252 has completed the searching process, as shown in FIG. 8D, the phases corresponding to the searched paths are designated to the fingers 251A, 251B, and 251C. Thus, the fingers 251A, 251B, and 251C operate. Consequently, as shown in FIG. 8B, the operation time $T_{11}$ of the controller 258 is almost equal to the time period after time $t_{11}$ to time $t_{12}$ designated in the reception mode. As a result, the operation time of the controller 258 becomes long, thereby increasing the power consumption thereof.

OBJECTS AND SUMMARY OF THE INVENTION

Therefore, an object of the present invention is to provide a receiving apparatus and a receiving method that allow the operation time of the controller to decrease in the intermittent reception mode and thereby the power consumption to decrease.

The present invention is a receiving apparatus for receiving a signal that has spectrum-spread with a spread code, comprising a searcher for searching paths of signals received from multi-paths, a plurality of fingers for de-spreading the received signals for the searched paths and demodulating data, a combiner for combining output data of the fingers, and a controlling means for controlling the receiving operation, wherein in a reception state the controlling means designates control information of the searcher for the next reception state and then keeps the stop state until the searcher completes an operation corresponding to the control information so as to intermittently receive the signal.

The present invention is a receiving method for receiving a signal that has spectrum-spread with a spread code, comprising the steps of causing a searcher to search paths of signals received from multi-paths, causing a plurality of fingers to de-spread the received signals for the searched paths and demodulate data, causing a combiner to combine output data of the fingers, and causing controlling means to control the receiving operation, wherein in a reception state the controlling means designates control information of the searcher for the next reception state and then keeps the stop state until the searcher completes an operation corresponding to the control information so as to intermittently receive the signal.

The present invention is a terminal unit for use with a radio system for spectrum-spreading a transmission signal with a spread code, transmitting the resultant signal, varying the pattern and phase of a code sequence of the spread code, and performing a multiple-access, comprising a searcher for searching paths of signals received from multi-paths, a plurality of fingers for de-spreading the received signals for the searched paths and demodulating data, a combiner for combining output data of the fingers, and a controlling means for controlling the receiving operation, wherein in a reception state the controlling means designates control information of the searcher for the next reception state and then keeps the stop state until the searcher completes an operation corresponding to the control information so as to intermittently receive the signal.

In the intermittent reception mode, while the controlling portion is operating, control information of the next reception state is designated. In the next reception mode, before a data process is not required, the operation of the controller is stopped. Thus, the operation time of the controller is decreased, thereby decreasing the power consumption thereof.

These and other objects, features and advantages of the present invention will become more apparent in light of the following detailed description of a best mode embodiment thereof, as illustrated in the accompanying drawings.

BRIEF DESCRIPTION OF THE DRAWINGS

FIGS. 13A to 13D are timing charts for explaining the portable telephone terminal unit of CDMA type according to the present invention; and FIGS. 14A to 14D are timing charts for explaining the portable telephone terminal unit of CDMA type according to the present invention.

DETAILED DESCRIPTION OF THE PREFERRED EMBODIMENTS

With reference to the accompanying drawings, an embodiment of the present invention will be described. FIG.

9 is a block diagram showing an example of a portable terminal unit for use with a cellular telephone system of CDMA type according to the present invention. The portable terminal unit uses diversity RAKE system as the receiving system. In the diversity RAKE system, signals are received from a plurality of paths at the same time. The received signals are combined.

Figure 1:
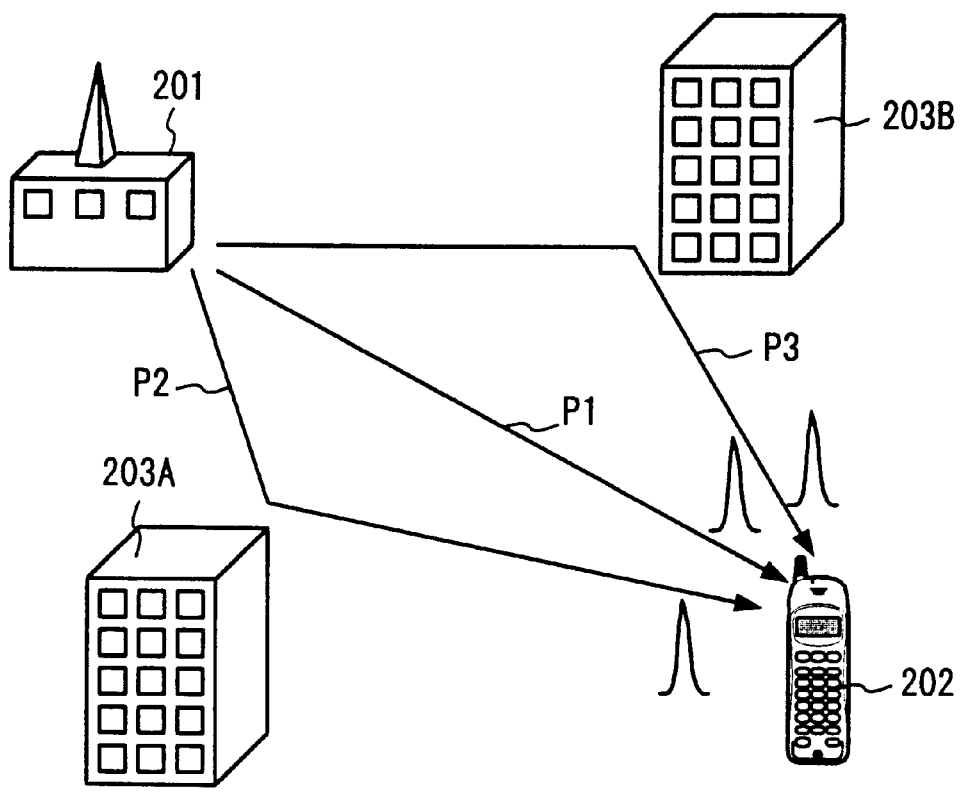
FIG. 1 is a schematic diagram for explaining multi-paths.
Figure 2:
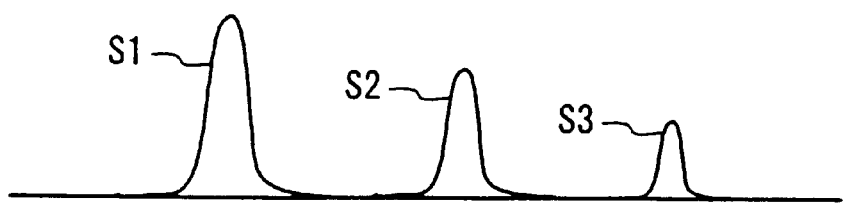
FIG. 2 is a schematic diagram showing a waveform for explaining multi-paths.
Figure 3:
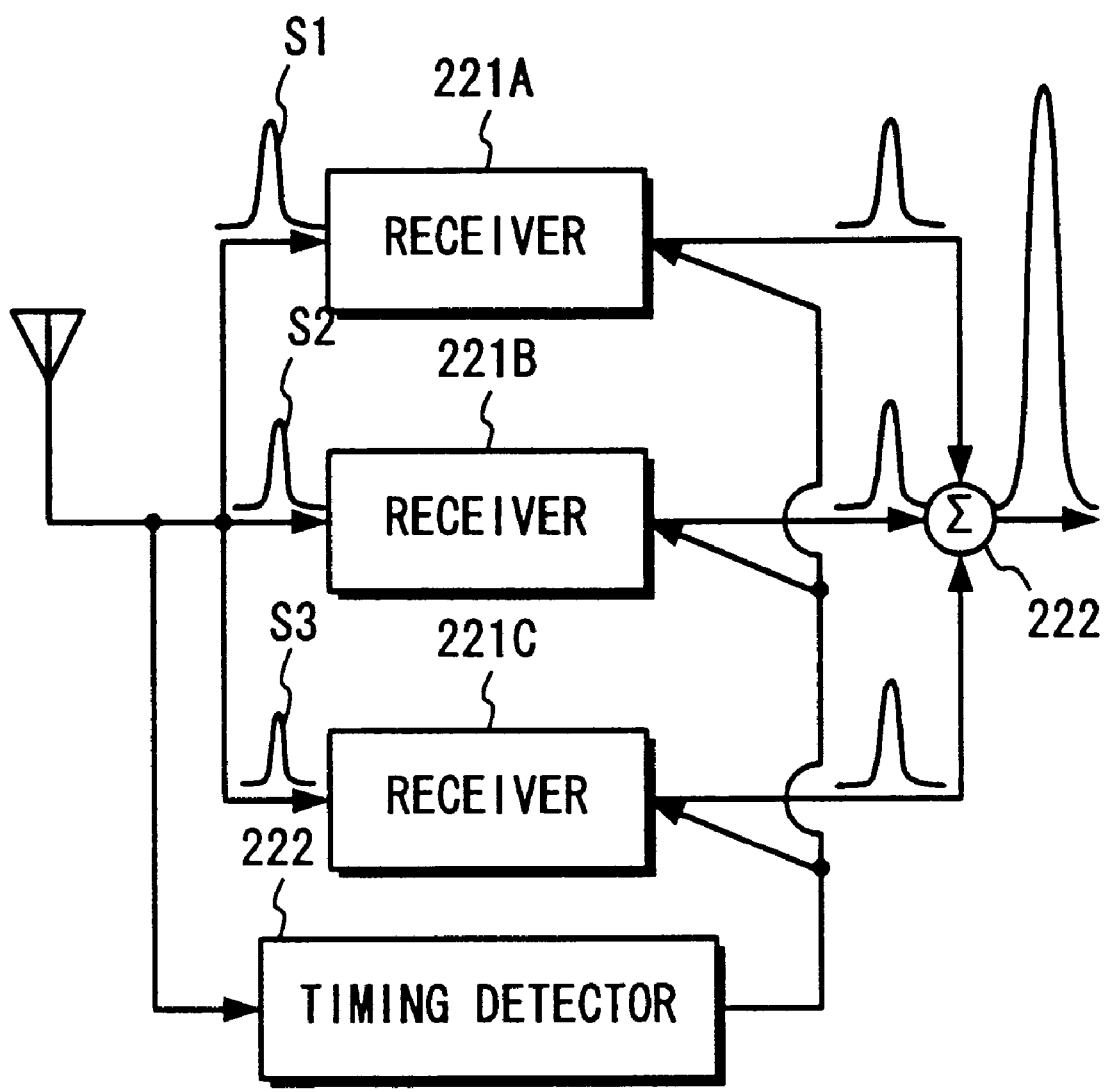
FIG. 3 is a block diagram for explaining a diversity RAKE system.
Figure 4:
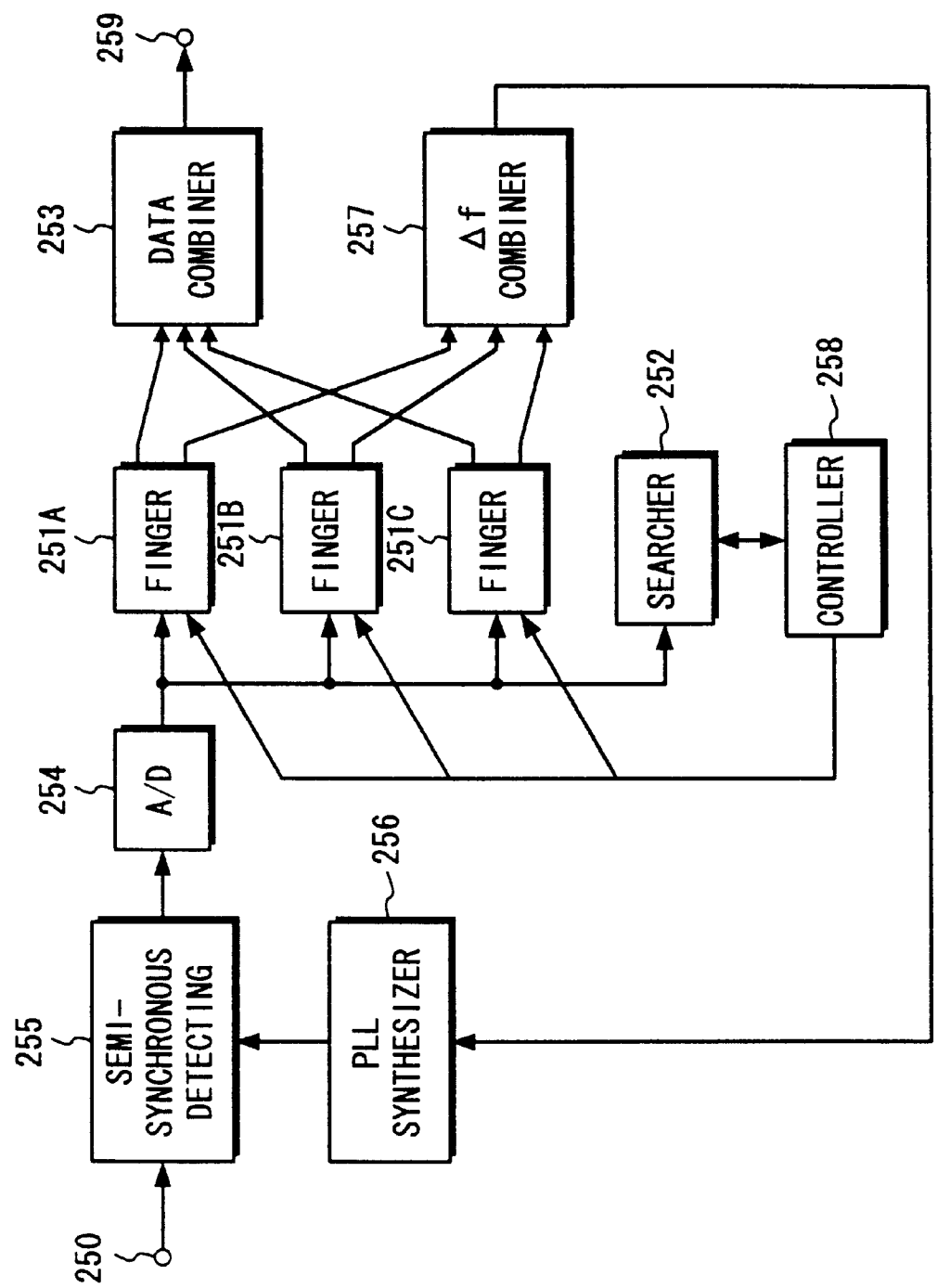
FIG. 4 is a block diagram showing an example of a receiver of the diversity RAKE system.
Figure 5:
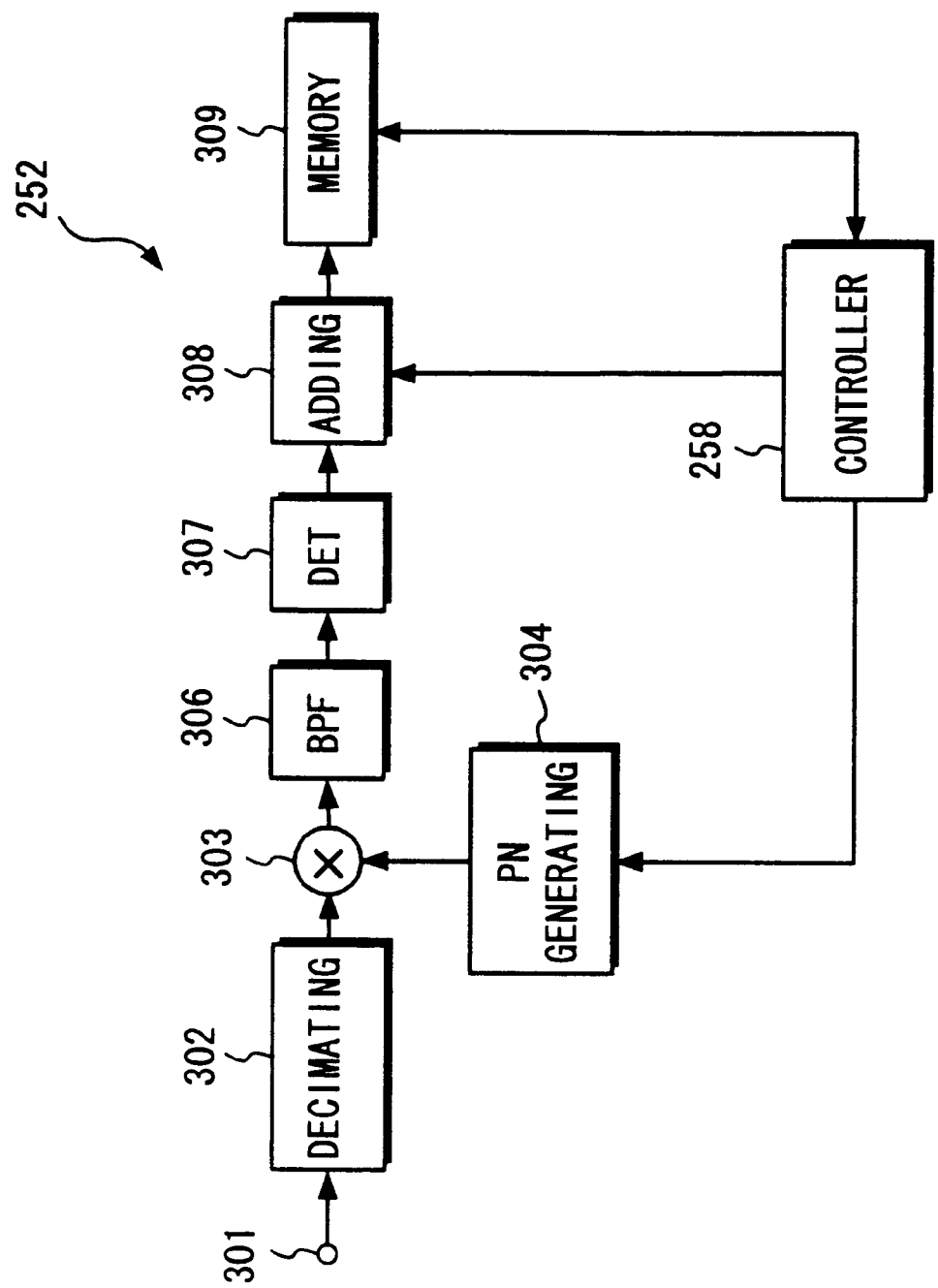
FIG. 5 is a block diagram showing an example of the structure of a conventional searcher.
Figure 6:
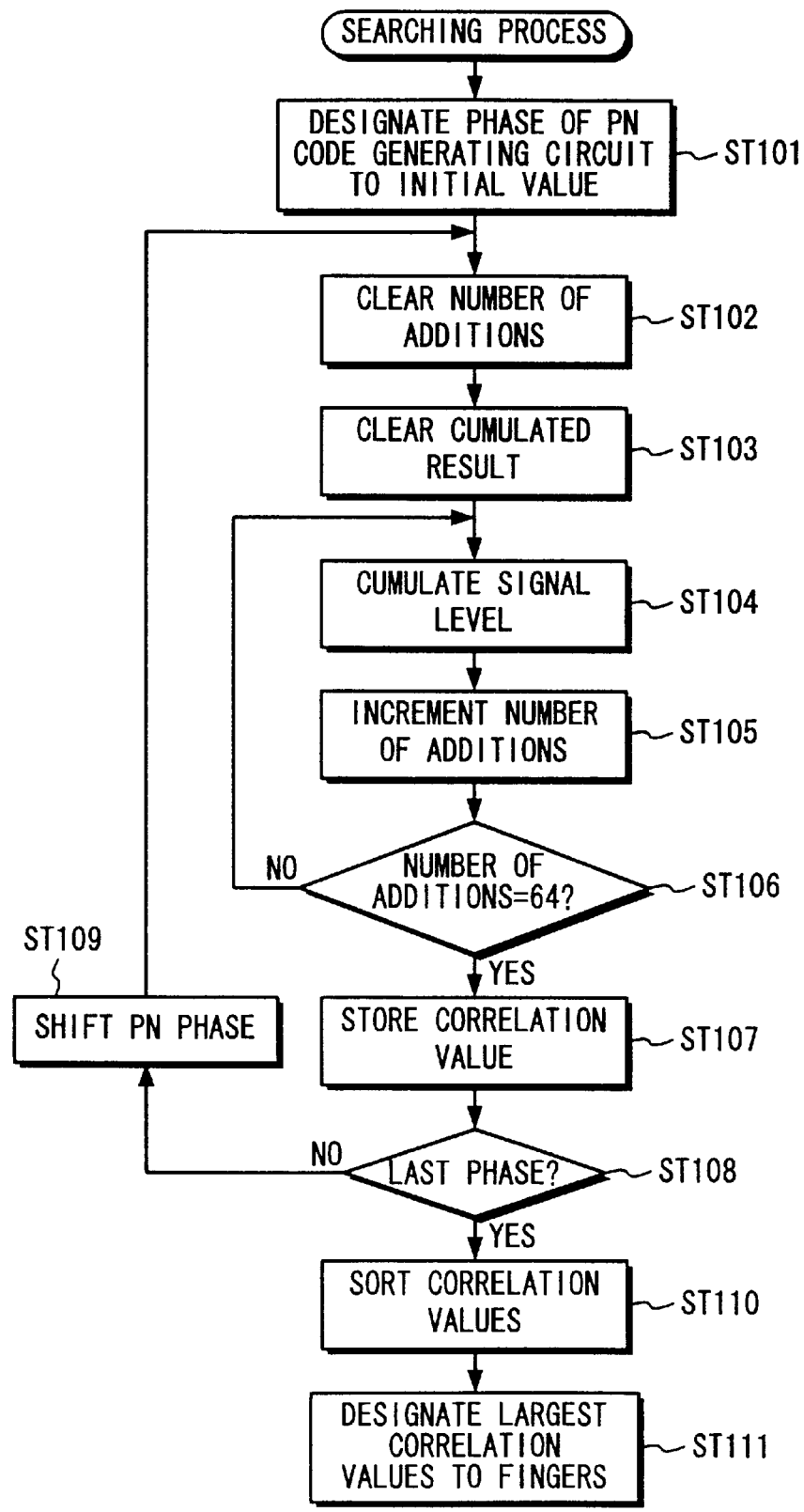
FIG. 6 is a flow chart for explaining the conventional searcher.
Figure 7:
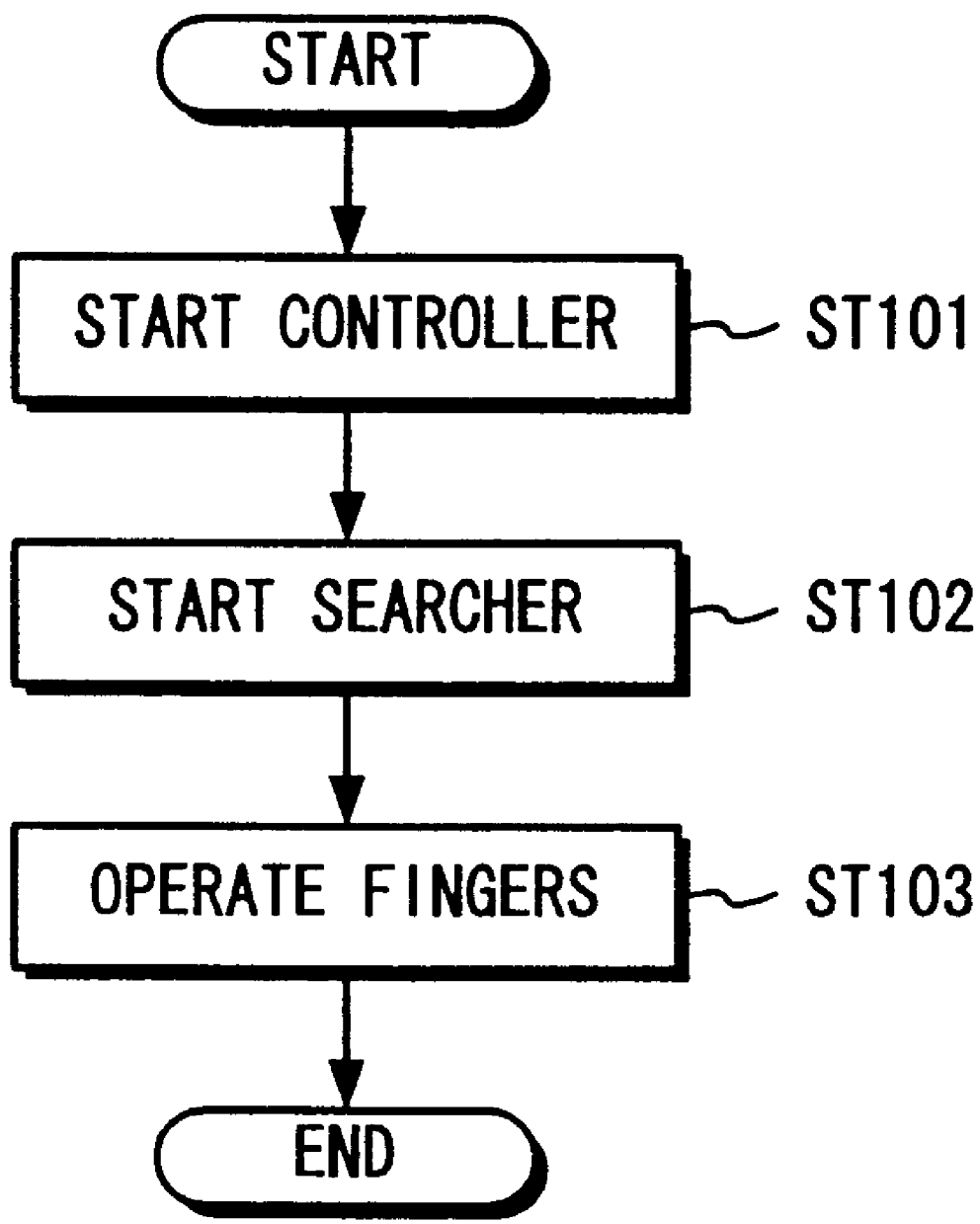
FIG. 7 is a flow chart for explaining a conventional terminal unit.
Figure 8:
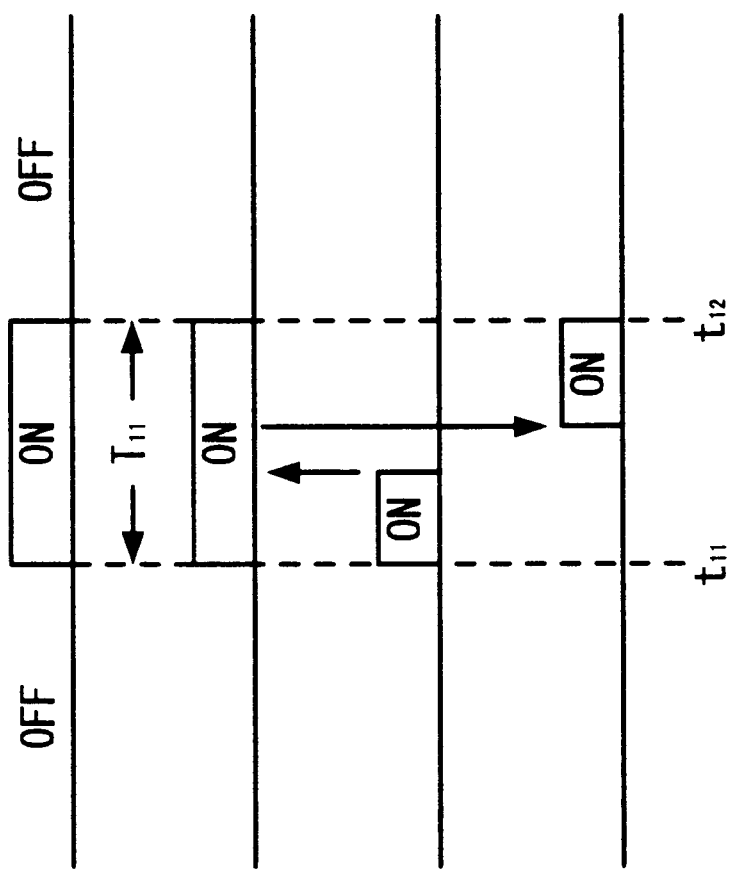
FIGS. 8A to 8D are timing charts for explaining the conventional terminal unit.
Figure 9:
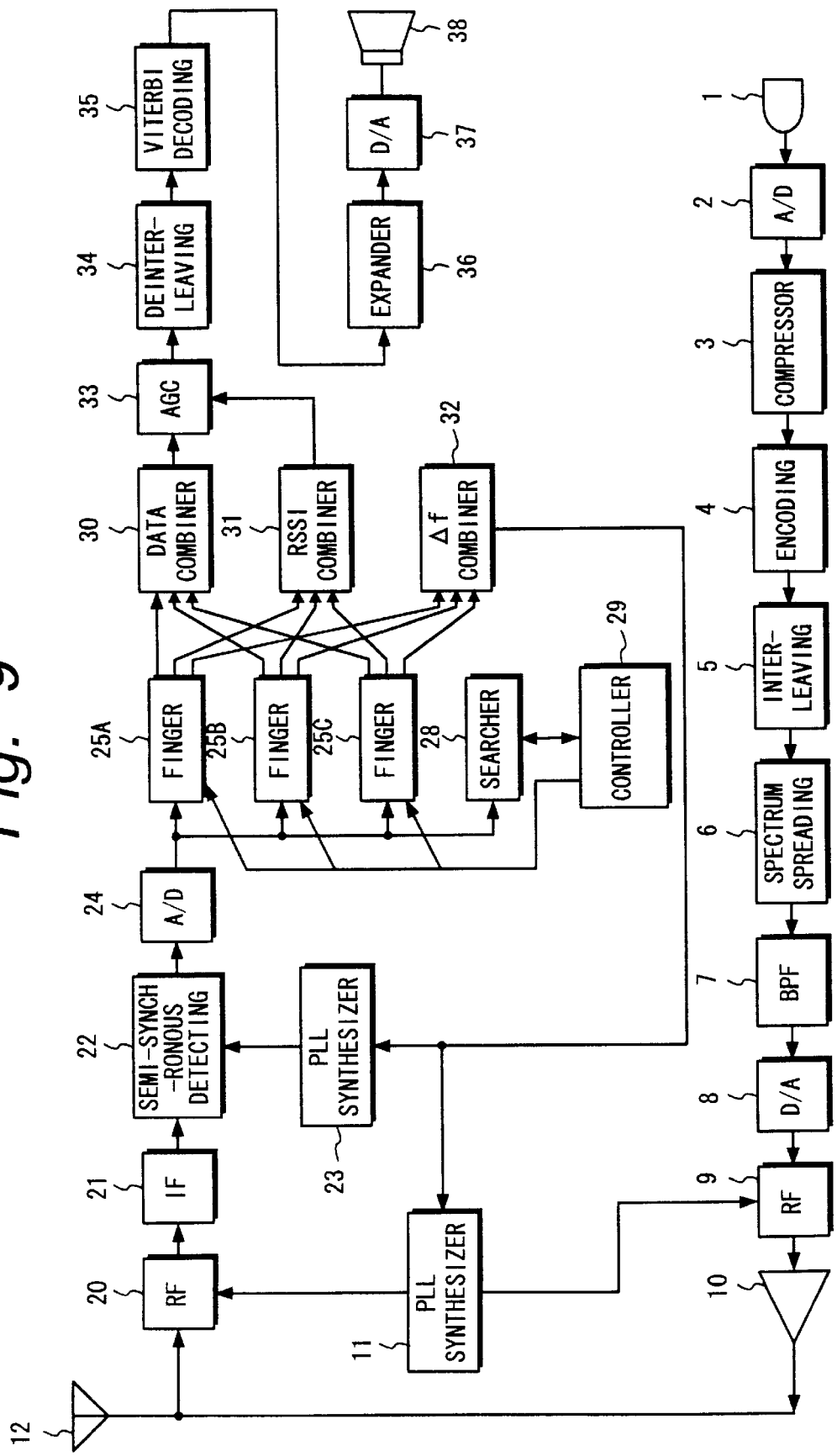
FIG. 9 is a block diagram showing the overall structure of a portable telephone terminal unit of CDMA type according to the present invention.

In FIG. 9, in the transmission mode, an audio signal is input to a microphone 1. The audio signal is supplied to an A/D converter 2. The A/D converter 2 converts an analog audio signal into a digital audio signal. An output signal of the A/D converter 2 is supplied to a audio compressing circuit 3.

The audio compressing circuit 3 compresses and encodes the digital audio signal. As examples of the compressing and encoding system, various types have been proposed. For example, a system such as QCELP (Qualcomm Code Excited Linear Coding) system can be used. In the QCELP system, depending on the characteristics of the sound of the user and the congestion state of the communication path, a plurality of encoding speeds can be used. In this case, four encoding speeds (9.6 kbps, 4.8 kbps, 2.4 kbps, and 1.2 kbps) can be selected. To maintain the communication quality, data can be encoded at the minimum speed. It should be noted that the audio compressing system is not limited to the QCELP system.

An output signal of the audio compressing circuit 3 is supplied to a convolutional encoding circuit 4. The convolutional encoding circuit 4 adds an error correction code as a convolutional code to the transmission data. An output signal of the convolutional encoding circuit 4 is supplied to an interleaving circuit 5. The interleaving circuit 5 interleaves the transmission data. An output signal of the interleaving circuit 5 is supplied to a spectrum spreading circuit 6.

The spectrum spreading circuit 6 primarily modulates the carrier and secondary modulates the resultant signal with a PN code. In other words, the spectrum spreading circuit 6 primarily modulates the transmission data corresponding to for example balanced QPSK modulating method. In addition, the resultant signal is multiplied by a PN code. Since the PN code is a random code, when the PN code is multiplied, the frequency band of the carrier is widened. Thus, the carrier is spectrum-spread. As an example of the modulating method for the transmission data, the balanced QPSK modulating method is used. However, another modulating method can be used in various methods that have been proposed.

An output signal of the spectrum spreading circuit 6 is supplied to a D/A converter 8 through a band pass filter 7. An output signal of the D/A converter 8 is supplied to an RF circuit 9.

A local oscillation signal is supplied from a PLL synthesizer 11 to the RF circuit 9. The RF circuit 9 multiplies the output signal of the D/A converter 8 by the local oscillation signal of the PLL synthesizer 11 and thereby converts the frequency of the transmission signal into a predetermined frequency. An output signal of the RF circuit 9 is supplied to an transmission amplifier 10. After the power of the transmission signal is amplified, the resultant signal is supplied to an antenna 12. A radio wave is sent from the antenna 12 to a base station.

In the reception mode, a radio wave sent from a base station is received by the antenna 12. Since the radio wave sent from the base station is reflected by buildings and so forth, the radio wave reaches the antenna 12 of the portable terminal unit through multi-paths. When the portable terminal unit is used in a car or the like, the frequency of the received signal may vary due to the Doppler effect.

The output signal of the antenna 12 is supplied to an RF circuit 20. The RF circuit 20 receives a local oscillation signal from the PLL synthesizer 11. The RF circuit 20 converts the received signal into an intermediate frequency signal with a predetermined frequency.

An output signal of the RF circuit 20 is supplied to a semi-synchronous detecting circuit 22 through an intermediate frequency circuit 21. An output signal of a PLL synthesizer 23 is supplied to the semi-synchronous detecting circuit 22. The frequency of the output signal of the PLL synthesizer 23 is controlled with an output signal of a frequency combiner 32. The semi-synchronous detecting circuit 22 quadrature-detects the received signal.

An output signal of the semi-synchronous detecting circuit 22 is supplied to an A/D converter 24. The A/D converter 24 digitizes the output signal of the semi-synchronous detecting circuit 22. At this point, the sampling frequency of the A/D converter 24 is higher than the chip-rate of the PN code that has been spectrum-spread. In other words, the input signal of the A/D converter is oversampled. An output signal of the A/D converter 24 is supplied to fingers 25A, 25B, and 25C. In addition, the output signal of the A/D converter 24 is supplied to a searcher 28.

As described above, in the reception mode, signals are received through multi-paths. The fingers 25A, 25B, and 25C multiply the signals received through the multi-paths by the PN code so as to de-spread the received signals. In addition, the fingers 25A, 25B, and 25C output the levels of the signals received through the multi-paths and the frequency errors of these multi-paths.

The searcher 28 acquires the codes of the received signals and designates the phase of the PN codes for the paths. In other words, the searcher 28 has a de-spreading circuit that multiplies the received signals by the respective PN codes and de-spread the received signals. The searcher 28 shifts the phases of the PN codes under the control of a controller 29 and obtains the correlation with the received codes. With the correlation values of the designated PN codes and the received codes, the phase of the PN codes for the respective paths are designated. The codes designated by the controller 29 are supplied to the fingers 25A, 25B, and 25C.

The received data for the respective paths demodulated by the fingers 25A, 25B, and 25C is supplied to a data combiner 30. The data combiner 30 combines the received data for the respective paths. An output signal of the data combiner 30 is supplied to an AGC circuit 33.

The fingers 25A, 25B, and 25C obtain the intensities of the signals received through the respective paths. The intensities of the signals received through the respective path are supplied from the fingers 25A, 25B, and 25C to a RSSI combiner 31. The RSSI combiner 31 combines the intensities of the signals received through the respective paths. An output signal of the RSSI combiner 31 is supplied to the AGC circuit 33. The gain of the AGC circuit 33 is controlled so that the signal level of the received data becomes constant.

The frequency errors for the respective paths are supplied from the fingers 25A, 25B, and 25C to the frequency combiner 32. The frequency combiner 32 combines the frequency errors for the respective paths. An output signal of the frequency combiner 32 is supplied to the PLL synthesizer 11 and 23. Corresponding to the resultant frequency error, the frequencies of the PLL synthesizer 11 and 23 are controlled.

An output signal of an AGC circuit 33 is supplied to a de-interleaving circuit 34. The de-interleaving circuit 34 de-interleaves the received data that has been interleaved on the transmission side. An output signal of the de-interleaving circuit 34 is supplied to a Viterbi decoding circuit 35. The Viterbi decoding circuit 35 decodes a convolutional code with a soft determining process and a maximum likelihood decoding process. The Viterbi decoding circuit 35 performs an error correcting process. An output signal of the Viterbi decoding circuit 35 is supplied to an audio expanding circuit 36.

The audio expanding circuit 36 decompresses the audio signal that has been compressed with for example the QCELP method and decodes a digital audio signal. The digital audio signal is supplied to a D/A converter 37. The D/A converter 37 restores a digital audio signal to an analog audio signal. The analog audio signal is supplied to a speaker 38.

Figure 10:
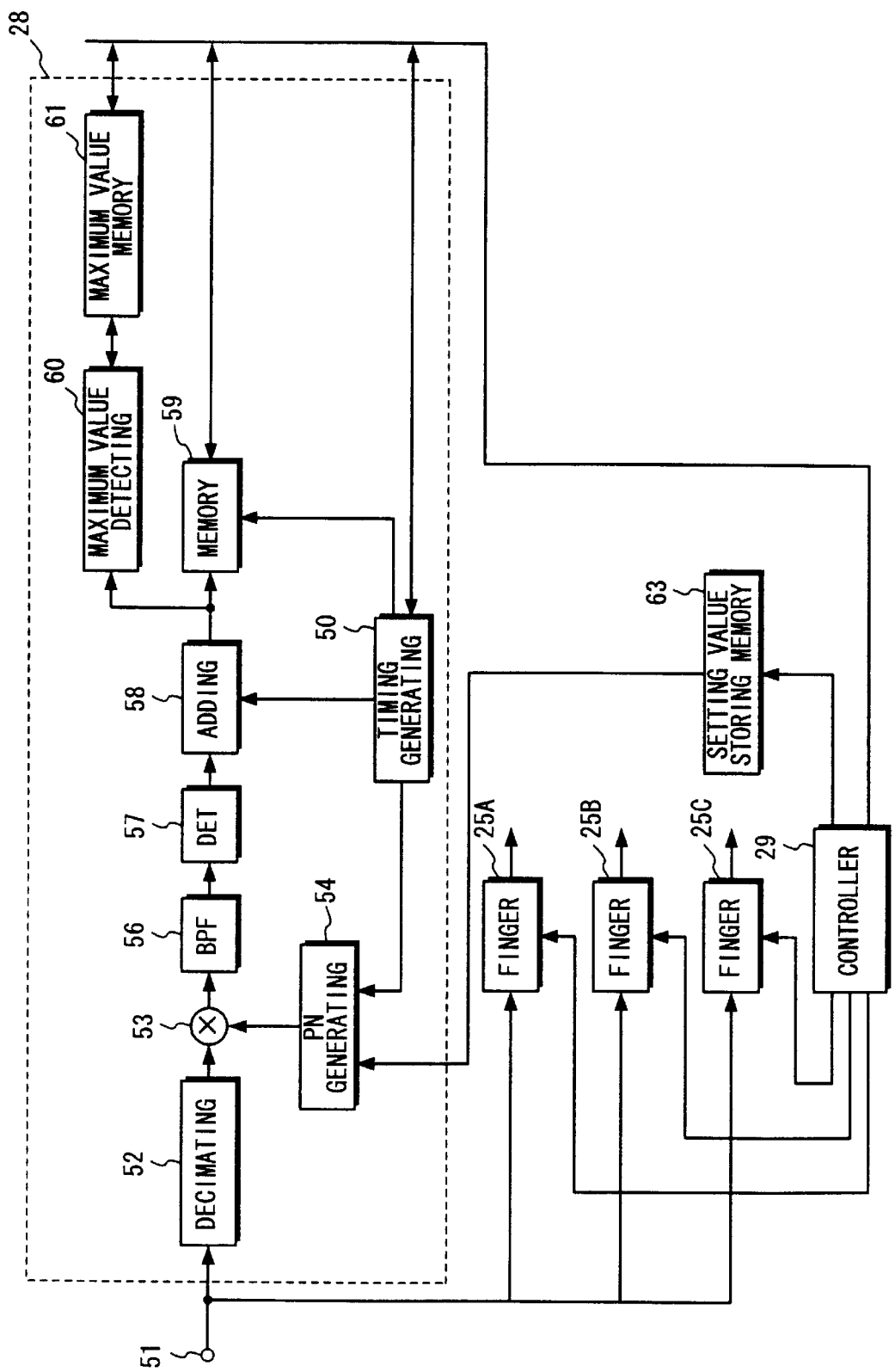
FIG. 10 is a block diagram showing an example of the structure of a searcher of the portable telephone terminal unit of CDMA type according to the present invention.

FIG. 10 is a block diagram showing the structure of the searcher 28 of the portable telephone terminal unit according to the present invention. In FIG. 10, a digital signal is supplied from the A/D converter 24 (see FIG. 9) to an input terminal 51. As described above, the sampling frequency of the A/D converter 24 is higher than the frequency of a PN code. In other words, the digital signal is over-sampled. The digital signal is supplied from the input terminal 51 to a decimating circuit 52. The decimating circuit 52 decimates the signal received from the input terminal 51. An output signal of the decimating circuit 52 is supplied to a multiplying circuit 53.

A PN code generating circuit 54 generates a PN code that has spread on the transmission side. The phase of the PN code received from the PN code generating circuit 54 can be designated by a controller 29. The PN code received from the PN code generating circuit 54 is supplied to the multiplying circuit 53.

The multiplying circuit 53 multiplies the output signal of the decimating circuit 52 by the PN code received from the PN code generating circuit 54. Thus, the received signal from the input terminal 51 de-spreads. When the pattern and the phase of the PN code in the received signal match the pattern and the phase of the PN code received from the PN code generating circuit 54, the received signal de-spreads. Thus, the level of an output signal of the multiplying circuit 53 becomes large. The output signal of the multiplying circuit 53 is supplied to a level detecting circuit 57 through a band pass filter 56. The level detecting circuit 57 detects the level of the output signal of the multiplying circuit 53.

An output signal of the level detecting circuit 57 is supplied to an adding circuit 58. The adding circuit 58 cumulates output data a predetermined number of times (for example, 64 times). With the cumulated value of the output data of the level detecting circuit 57, correlation values of the PN code designated to the PN code generating circuit 54 and the received PN code are obtained. An output signal of the adding circuit 58 is supplied to a memory 59. In addition, the output signal of the adding circuit 58 is supplied to a maximum value detecting circuit 60. The maximum value detecting circuit 60 obtains the maximum value of the correlation values. The maximum value of the correlation value is stored in a maximum value memory 61.

The phase of the PN code received from the PN code generating circuit 54 is shifted every predetermined number of chips (for example, every chip or every ½ chip). The correlation values are obtained from the output signal of the adding circuit 58 for each phase. The correlation value is stored in the memory 59. After the PN code has been designated for one period, for example three phases with the largest correlation values are selected. The selected phases are designated to the fingers 25A, 25B, and 25C.

When the three phases are selected in the order of the larger correlation values and three paths are designated, the maximum value stored in the maximum value memory 61 is used. Thus, since a complicated sorting process of the controller 29 is not required, the load applied to the controller 29 is alleviated.

Examples of the algorithm of the sorting process are quick sorting method and heap sorting method. However, in the algorithm of such a sorting process, a plurality of comparing calculations are required. Thus, the load applied to the controller 258 becomes large. On the other hand, when the maximum value of the correlation values is known, by comparing the correlation values with the maximum value, the n largest correlation values can be easily obtained. Thus, when the maximum value of the correlation values is stored in the maximum value memory 61, the load applied to the maximum value memory 61 can be alleviated.

Figure 11:
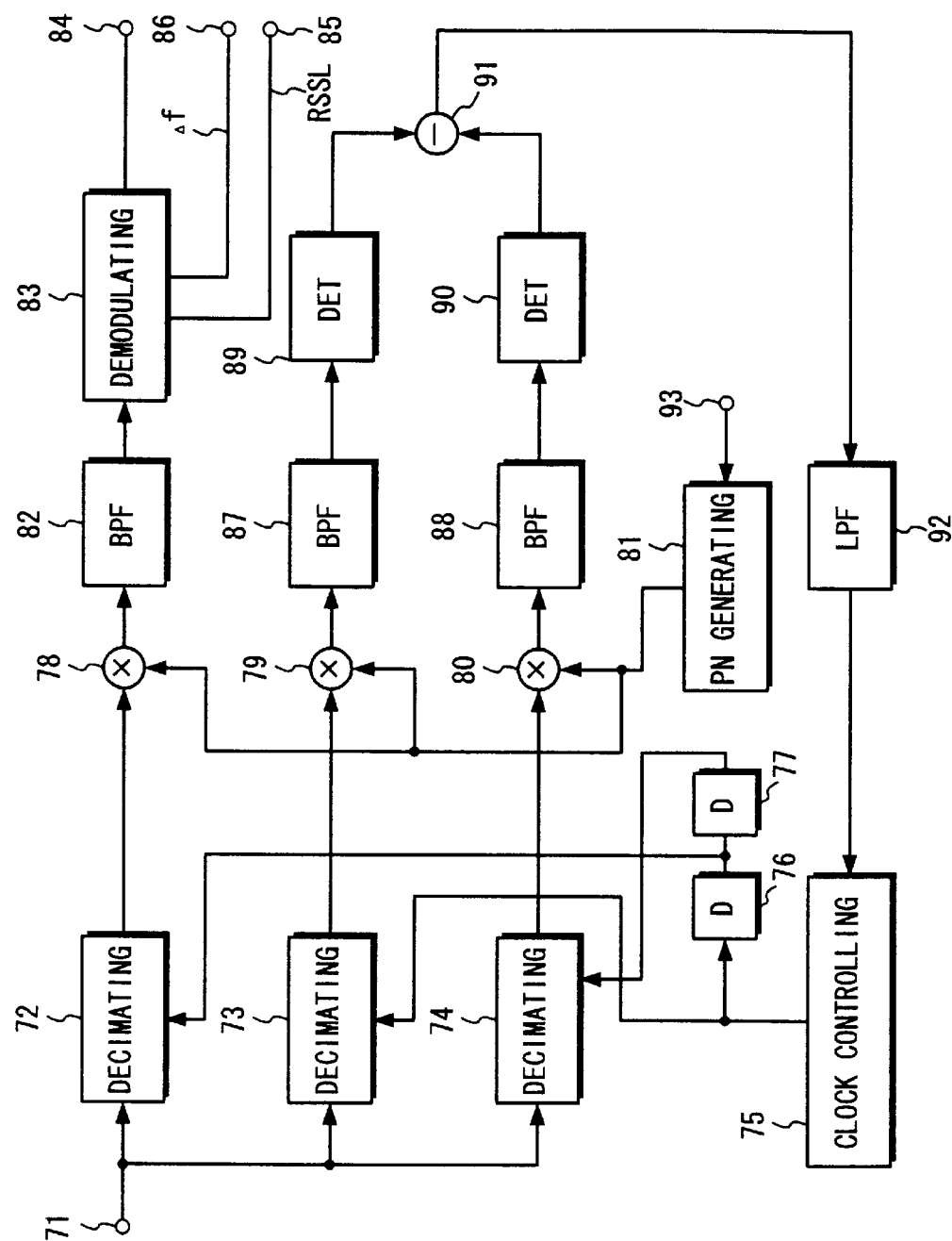
FIG. 11 is a block diagram showing an example of the structure of a finger of the portable telephone terminal unit of CDMA type according to the present invention.

FIG. 11 is a block diagram showing the structure of each of the fingers 25A, 25B, and 25C of the portable telephone terminal unit according to the present invention. A digital signal is supplied from the A/D converter 24 (see FIG. 9) to an input terminal 71. As described above, the sampling frequency of the A/D converter 24 is higher than the frequency of the PN code. In other words, the digital signal is over-sampled.

The digital signal is supplied from the input terminal 71 to decimating circuits 72, 73, and 74. A clock is supplied from a clock controlling circuit 75 to the decimating circuit 72 through a delaying circuit 76. The clock from the clock controlling circuit 75 is directly supplied to the decimating circuit 73. The clock from the clock controlling circuit 75 is supplied to the decimating circuit 74 through delaying circuits 76 and 77. Each of the delaying circuits 76 and 77 has a delay amount for ½ chip. The decimating circuits 72, 73, and 74 decimate the digital signal received from the input terminal 71.

Output signals of the decimating circuits 72, 73, and 74 are supplied to multiplying circuits 78, 79, and 80, respectively. The PN code is supplied from a PN code generating circuit 81 to the multiplying circuits 78, 79, and 80. The PN code generating circuit 81 generates the same PN code that has spread on the transmission side.

The multiplying circuit 78 multiplies the output signal of the decimating circuit 72 by an output signal of the PN code generating circuit 81. When the pattern and the phase of the received PN code match the pattern and the phase of the code received from the PN code generating circuit 81, the multiplying circuit 78 outputs a de-spread signal. An output signal of the multiplying circuit 78 is supplied to a demodulating circuit 83 through a band pass filter 82.

The demodulating circuit 83 demodulates the received signal. The demodulating circuit 83 outputs demodulated data. The demodulated data is output from an output terminal 84. The demodulating circuit 83 detects the level of the received signal. The signal level is obtained from an output terminal 85. The demodulating circuit 83 detects a frequency error. The frequency error is obtained from an output terminal 86.

The multiplying circuits 79 and 80 multiply output signals of the decimating circuits 73 and 74 by the output signal of the PN code generating circuit 81, respectively. The clock of the clock controlling circuit 75 is directly supplied to the decimating circuit 73. The clock supplied from the clock controlling circuit 75 to the decimating circuit 74 is delayed by one chip. Assuming that the phase of the output signal of the decimating circuit 72 is the center phase, an output signal with a phase advanced by ½ chip from the center phase and an output signal with a phase delayed by ½ chip from the center phase are obtained from the decimating circuits 73 and 74, respectively. The multiplying circuits 79 and 80 multiply the signal with the phase advanced by ½ chip from the center phase and the signal with the phase delayed by ½ chip from the center phase by the code received from the PN code generating circuit 81. Thus, de-spread output signals with the phases advanced by ½ chip and delayed by ½ chip from the center phase are obtained. Output signals of the multiplying circuits 79 and 80 are used to form a DLL (Delay Locked Loop).

In other words, the output signals of the multiplying circuits 79 and 80 are supplied to level detecting circuits 89 and 90 through band pass filters 87 and 88, respectively. The level detecting circuits 89 and 90 output the levels of the de-spread signals with the phases advanced by ½ chip and delayed by ½ chip. Output signals of the level detecting circuits 89 and 90 are supplied to a subtracting circuit 91.

The subtracting circuit 91 compares the level of the de-spread signal with the phase advanced by ½ chip and the level of the de-spread signal with the phase delayed by ½ chip. An output signal of the subtracting circuit 91 is supplied to the clock controlling circuit 75 through a loop filter 92. The clock controlling circuit 75 controls the clock supplied to the decimating circuits 72 to 74 so that the level of the output signal of the subtracting circuit 91 becomes 0.

Assuming that an input signal is over-sampled eight times by the A/D converter 24 and that the resultant signal is ⅛ decimated by the decimating circuits 72 to 74, the decimating circuits 72 to 74 output signals at intervals of every eight samples. When it is determined that the current timing is very late corresponding to the output signal of the subtracting circuit 91, the signal is output at intervals of every seven samples instead of every eight samples. Thus, the phase of the signal is advanced.

Initial phase data is supplied from an input terminal 93 to the PN code generating circuit 81. The initial phase data is designated corresponding to a path detected by the searcher 28. Corresponding to the fluctuation of the code, the above-described DLL loop operates so as to acquire the received PN code.

As shown in FIG. 11, the searcher 28 of the portable terminal unit according to the present invention has a timing generating circuit 50 that generates various timing signals. The timing generating circuit 50 can perform the searching process without need to use the controller 29. The current setting values such as the phase of the PN code and search mode are stored in a setting value storing memory 63.

Since the searcher 28 of the portable terminal unit according to the present invention can perform the searching process without need to use the controller 29, the searcher 28 can complete the searching process before the controller 29 starts operating.

Figure 12:
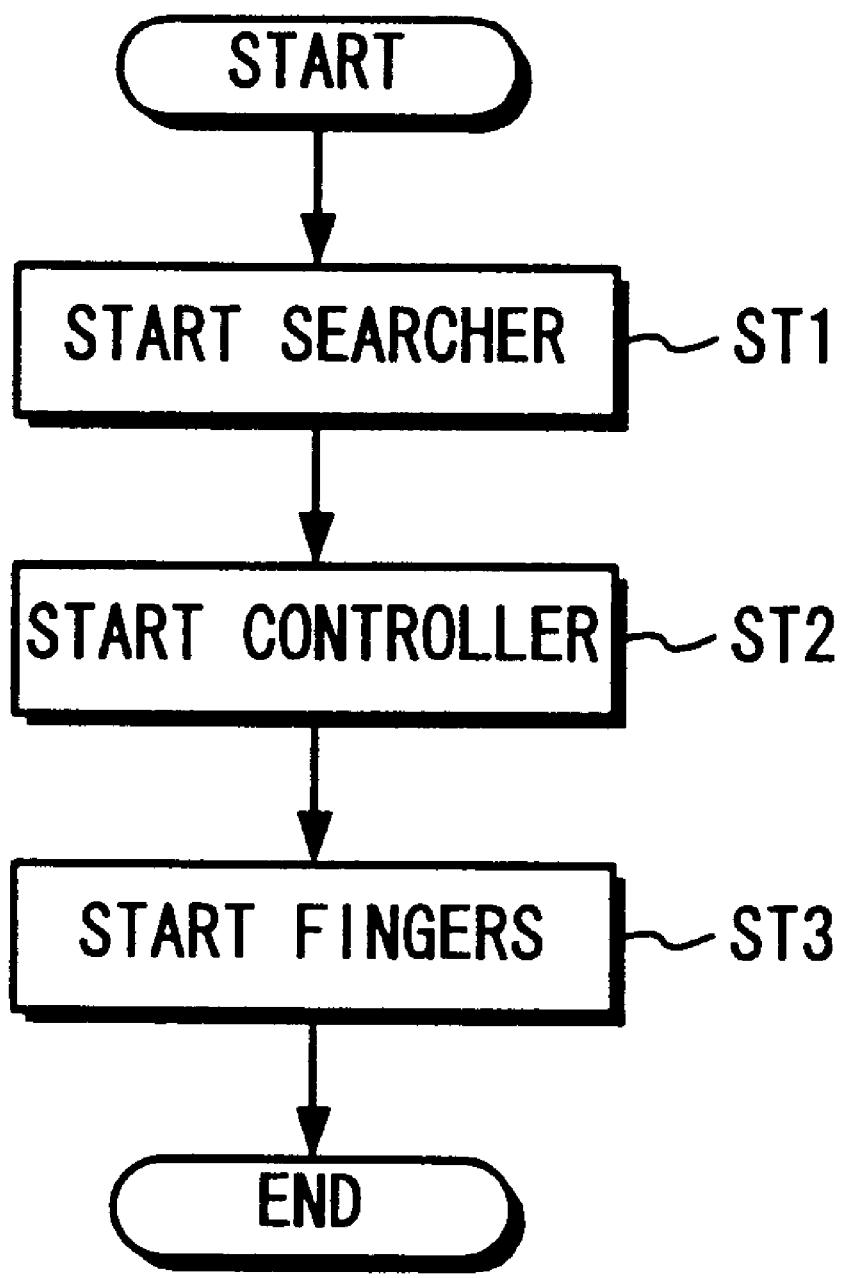
FIG. 12 is a flow chart for explaining the portable telephone terminal unit of CDMA type according to the present invention.

Thus, in the portable terminal unit according to the present invention, as shown in FIG. 12, in the intermittent reception mode, the searcher 28 starts operating (at step ST1). After the searcher 28 has completed the searching process, the controller 29 starts operating (at step ST2). After the searcher 28 has acquired the phase of the PN code of each path, the phases acquired by the searcher 28 are designated to the fingers 25A, 25B, and 25C. Thus, the fingers 25A, 25B, and 25C start operating (at step ST3). In other words, while the searcher 28 is performing the searching process, the controller 29 does not operate. After the searcher 28 has completed the searching process, the controller 28 starts operating. Thus, the time period of which the controller 29 operates becomes short, thereby decreasing the power consumption thereof.

In other words, as shown in FIG. 13A, when the portable terminal unit enters the reception mode from time $t_1$ to time $t_2$, as shown in FIG. 13C, after the current reception mode is completed, the phase to be searched is stored in the setting value memory 63 at time $t_0$. At time $t_1$, the searcher 28 starts operating. After the searcher 28 has completed the searching process, as shown in FIG. 13B, the controller 29 starts operating. As shown in FIG. 13D, the phases of the received PN codes of the paths searched by the searcher 28 are designated to the fingers 25A, 25B, and 25C. Thus, the fingers 25A, 25B, and 25C start operating.

Consequently, as shown in FIG. 13A, when the portable terminal unit enters the reception mode from time $t_1$ to $t_2$, time $T_1$ of which the controller 29 starts operating is after the searcher 28 completes the searching process until the fingers 25A, 25B, and 25C complete demodulating operations. Thus, the operation time of the controller 29 becomes short, thereby decreasing the power consumption thereof.

In addition, as shown in FIG. 14C, after the searcher 28 starts operating, the controller 29 starts operating. As shown in FIG. 14D, the phases of the received PN codes of the paths searched by the searcher 28 are designated to the fingers 25A, 25B, and 25C. Thereafter, the operation of the controller 29 stops. The fingers 25A, 25B, and 25C start operating. Just before the reception operation completes, the controller 29 starts operating for the next reception. In this situation, the operation time of the controller becomes much shorter, thereby further decreasing the power consumption thereof.

According to the present invention, in the intermittent reception mode, while a controlling portion is operating before it enters a sleep state, control information for the next reception mode is designated. Even in the next reception mode, before a data process is required, the operation of the controller can be stopped. Thus, the operation time of the controller becomes short, thereby decreasing the power consumption thereof.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A receiving apparatus for receiving a signal that has been spectrum-spread with a spread code, comprising:

a searcher for searching paths of signals received from multi-paths;

a plurality of fingers for de-spreading the received signals for the searched paths and for demodulating data;

a combiner for combining output data of said fingers; and controlling means for controlling an intermittent receiving operation, wherein in a reception state said controlling means produces control information for said searcher for a subsequent reception state and switches to a stopped state until said searcher completes an operation corresponding to said control information, thereby reducing power consumption.

2. The receiving apparatus as set forth in claim 1, wherein in said subsequent reception state said controlling means switches to a stopped state while said fingers are operating.

3. A receiving method for receiving a signal that has been spectrum-spread with a spread code, comprising the steps of:

causing a searcher to search paths of signals received from multi-paths;

causing a plurality of fingers to de-spread the received signals for the searched paths and to demodulate data;

causing a combiner to combine output data of said fingers; and causing controlling means to control an intermittent receiving operation, wherein in a reception state said controlling means produces control information for said searcher for a subsequent reception state and switches to a stopped state until the searcher completes an operation corresponding to said control information, thereby reducing power consumption.

4. The receiving method as set forth in claim 1, wherein in said subsequent reception state said controlling means switches to a stopped state while the fingers are operating.

5. A terminal unit for use with a radio system for spectrum-spreading a transmission signal with a spread code, transmitting the spectrum-spread signal, varying a pattern and a phase of a code sequence of said spread code, and for performing a multiple-access, comprising:

a searcher for searching paths of signals received from multi-paths;

a plurality of fingers for de-spreading the received signals for the said searched paths and for demodulating data;

a combiner for combining output data of said fingers; and controlling means for controlling an intermittent receiving operation, wherein in a reception state said controlling means produces control information for said searcher for a subsequent reception state and switches to a stopped state until said searcher completes an operation corresponding to said control information, thereby reducing power consumption.

* * * * *